(No Model.)

J. W. RUGER.
CUTTER FOR CRACKER MACHINES.

No. 422,039. Patented Feb. 25, 1890.

Chas J Buchheit
Theo. L. Popp
Witnesses.

J. W. Ruger Inventor.
By Wilhelm Bonner
Attorneys.

UNITED STATES PATENT OFFICE.

JAMES W. RUGER, OF BUFFALO, NEW YORK.

CUTTER FOR CRACKER-MACHINES.

SPECIFICATION forming part of Letters Patent No. 422,039, dated February 25, 1890.

Application filed June 15, 1889. Serial No. 314,413. (No model.)

*To all whom it may concern:*

Be it known that I, JAMES W. RUGER, a citizen of the United States, residing at Buffalo, in the county of Erie and State of New York, have invented new and useful Improvements in Cutters for Cracker-Machines, of which the following is a specification.

This invention relates to the cutters which are more especially employed on cracker-machines for dividing sheets of dough into sections or divisions previous to baking the same, so that the sheets are readily broken up into crackers after having been baked. Sharp cutters have heretofore been used for this purpose; but these cutters are undesirable, as they cut the skin of the dough and leave the edges of the sections open, whereby the carbonic-acid gas, saccharine matter of the flour, and a portion of the shortening are allowed to escape while being baked, which impairs the quality of the crackers and causes the formation of blow-holes in the edges thereof. To overcome this difficulty blunt or dull cutters have been employed for dividing the dough, which cutters press into the dough and bind the edges thereof by uniting its outer skins, thereby sealing the edges of the cracker-sections and confining the carbonic-acid gas. In order to bake the dough evenly and prevent overbaking of portions thereof, it is necessary to form vent-openings therein for the escape of the steam generated underneath the sheet of dough, and to allow the heat to pass through to bake the edges of the crackers. Blunt cutters, while dividing the dough and sealing the edges thereof, do not form permanent vent-openings in the dough, as the depressed or displaced dough by its elasticity expands after the withdrawal of the blunt cutters and closes the openings at the lower side of the sheet of dough, preventing the escape of steam and preventing the heat from passing around the edges of the crackers to properly bake them.

The object of my invention is to construct an efficient cutter whereby the dough is perforated to form vent-openings and at the same time sealed at the division-lines, and which shall offer comparatively little resistance, so that the cutter may be employed for producing very small crackers.

My invention consists of the improvements which will be hereinafter fully set forth, and pointed out in the claims.

Figure 1:
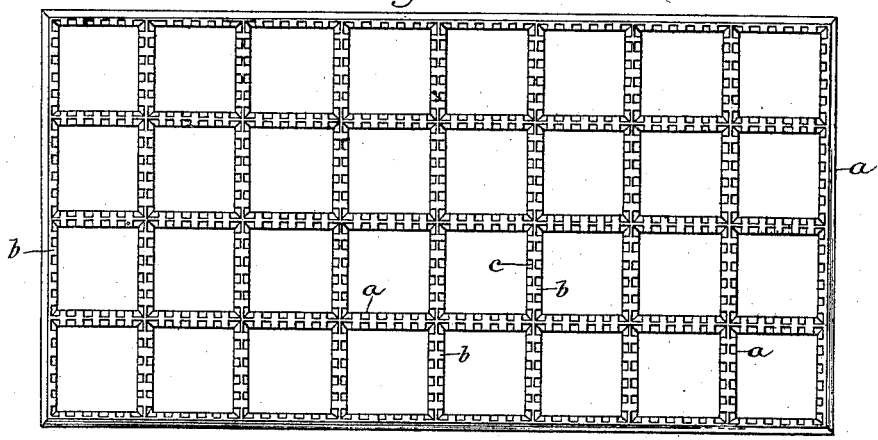
Figure 2:
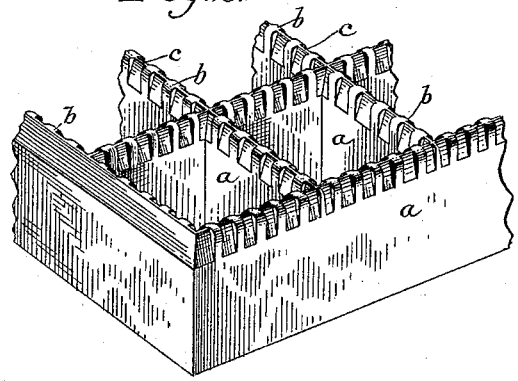
Figure 3:
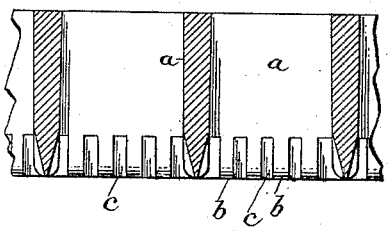
Figure 4:
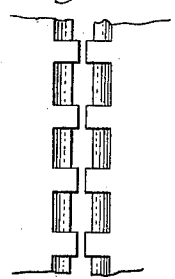
Figure 6:
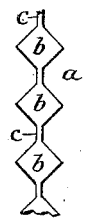
Figure 5:

In the accompanying drawings, Figure 1 is a bottom plan view of the cutter. Fig. 2 is an inverted perspective view of a portion of the cutter. Fig. 3 is a cross-section thereof. Fig. 4 is a plan view of a portion of a sheet of dough, showing the form of the openings produced by the cutter. Fig. 5 is a cross-section of the sheet of dough, showing the action of the cutters on the dough. Fig. 6 is a bottom plan view showing a modified form of the faces of the cutter.

Like letters of reference refer to like parts in the several figures.

The cutter-head consists of intersecting vertical bars $a$, which may be arranged to form a series of cutting-edges of square, diamond-shaped, or other outline, according to the form which it is desired to give the crackers. Each bar $a$ is provided at its lower edge with blunt or broad perforating faces or punches $b$, and sharp or narrow cutting edges or faces $c$, arranged between or alternating with said blunt faces. The lateral edges of the blunt perforating-faces $b$ are preferably rounded or curved, as shown in Figs. 2 and 3, so as to present dull round faces to the dough, which press down the dough and spread it apart in forming the perforations, but do not cut directly into its skin, like sharp cutters.

The sheet of dough to be divided is fed upon the carrying-apron, which passes underneath the reciprocating cutter-head in the usual manner. As the cutter descends into the dough the blunt faces $b$ form lines of small perforations in the dough, and the sharp or narrow cutting-edges $c$ form connecting slits or incisions between these perforations. The blunt faces by pressing down the dough without cutting into it bind or unite the upper and lower skins of the sheet of dough and seal the edges of the sections, and at the same time form the perforations, while the sharp edges cut or sever the skin of the dough between these perforations and impair the elasticity of the adjacent portions of the dough bounding the perforations, thereby reducing the tendency of the portions of the dough around the ends of the slits to expand and return to their former position and preventing the entire closing of the perforations in baking. The displaced portions of the dough bounding the perforations which are remote from the slits tend to expand and slightly reduce the size of the perforations; but the latter remain of sufficient size to permit the free escape of the steam formed on the pan underneath the sheet of dough. The slits formed by the sharp cutting-edges are closed by the expansion of the dough upon placing the sheet in the oven to be baked, whereby the edges of the cracker-sections are practically sealed and the escape of the carbonic-acid gas is prevented, the perforations allowing the heat to pass up through the sheet of dough and to bake the crackers evenly and causing the crackers to break apart easily when taken out of the oven.

The slits or incisions produced by the sharp cutters, in connection with the perforations, form division-lines, which are so friable as to allow the baked crackers to fall apart in removing the same from the pan without breaking diagonally, while leaving a clean edge on the crackers.

As the crackers are sealed at their edges by their skins, the bodies of the crackers are more firmly held together than those of ordinary crackers, rendering them less liable to split in shipping and causing them to retain their flavor and remain crisp and fresh for a longer period than common crackers. The perforations being formed partly in one and partly in the other of two adjacent rows of crackers, they form an ornamental edge or border on the crackers, which improves the appearance thereof.

By providing the cutter with alternate blunt and sharp cutting or dividing edges the resistance of the cutter is rendered much less than that of a cutter having continuous blunt edges, and the power required for forcing the cutter through the sheet of dough is correspondingly reduced. This permits my improved cutter to be used for producing very small crackers, for which blunt cutters are not available on account of the increased contact-surface of such cutters with the dough, which prevents the cutter from being forced down through the dough at the rapid speed at which such cutters are required to be operated.

Instead of arranging the blunt perforating-faces transversely to the longitudinal direction of the narrow cutting-faces, as represented in Figs. 1, 2, and 3, they may be arranged obliquely or diagonally, so as to have a diamond-shaped form, as represented in Fig. 6.

I claim as my invention—

1. A cutter for cracker-machines provided with alternate blunt or broad and sharp or narrow cutting-faces, substantially as set forth.

2. A cutter for cracker-machines provided with blunt perforating faces or punches having rounded edges and sharp or narrow cutting-faces arranged between said blunt perforating-faces, substantially as set forth.

Witness my hand this 3d day of May, 1889.

JAMES W. RUGER.

Witnesses:
 JNO. J. BONNER,
 F. C. GEYER.